(12) United States Patent
Blam

(10) Patent No.: US 6,467,041 B1
(45) Date of Patent: Oct. 15, 2002

(54) THIRD PARTY HOST PACKET REPLICATION

(75) Inventor: Norbert Blam, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/306,187

(22) Filed: May 6, 1999

(51) Int. Cl.[7] .................................................. G06F 1/32
(52) U.S. Cl. ............................ 713/310; 713/2; 709/227
(58) Field of Search ............................... 709/222, 227, 709/304; 713/300–340, 2

(56) References Cited

U.S. PATENT DOCUMENTS

| | | | | |
|---|---|---|---|---|
| 5,404,527 A | * | 4/1995 | Irwin et al. | 713/310 |
| 5,692,197 A | * | 11/1997 | Narad et al. | 713/310 |
| 5,802,305 A | * | 9/1998 | McKaughan et al. | 713/310 |
| 5,978,912 A | * | 11/1999 | Rakavy et al. | 713/310 |
| 5,983,353 A | * | 11/1999 | McHann et al. | 713/310 |
| 6,085,328 A | * | 7/2000 | Klein et al. | 713/310 |
| 6,215,764 B1 | * | 4/2001 | Wey et al. | 713/310 |
| 6,243,832 B1 | * | 6/2001 | Eckes et al. | 713/310 |
| 6,282,642 B1 | * | 8/2001 | Cromer et al. | 713/310 |
| 6,292,890 B1 | * | 9/2001 | Crisan | 713/310 |
| 6,311,276 B1 | * | 10/2001 | Connery et al. | 713/310 |

* cited by examiner

*Primary Examiner*—Paul R. Myers
(74) *Attorney, Agent, or Firm*—Joseph P. Lally; Mark E. McBurney; J. Bruce Schelkopf

(57) ABSTRACT

A computer network and network client where the network client includes a nonvolatile storage device for storing a packet replication indicator and a third party host identifier. The client further includes means for modifying the state of the packet replication indicator and the third party host identifier. The client has means for initiating a boot code sequence stored on a client boot code storage device. If the client detects a specified state of the packet replication indicator, the boot code sequence establishes a communication socket with a third party host identified by the third party host identifier and forwards copies or replicates of packets that are exchanged between the network client and a network server. In one embodiment the packets are replicated to the third party host until the boot sequence terminates. The third party host identifier is preferably comprised of an IP address portion and a third party host port identifier portion. In one embodiment, the means for modifying the packet replication indicator is invoked through a user interface that is produced in response to a specified input sequence during execution of the boot sequence. The boot code sequence may be initiated through the use of a reset button on the client or through a network wakeup event initiated by the network server. Packets are preferably replicated at the device link layer to minimize the effect of various hardware and media specific network implementations. The network client, for example may reside within a token ring or Ethernet subnet.

22 Claims, 2 Drawing Sheets

THIRD PARTY HOST PACKET REPLICATION

BACKGROUND

1. Field of the Present Invention

The present invention generally relates to the field of computer networks and more specifically to a method for debugging network level problems from a remote location.

2. History of Related Art

Client-server computer networks are becoming increasingly pervasive in a wide range of applications. The various network protocols in use and the intricacies of client-sever interactions frequently make the debugging of network level problems an essential task. In networks wherein the clients are required to download an operating system kernel from a network server each time the client is booted, network level debugging during the boot timeframe is critical. Conventionally, debugging network level communication problems has been achieved with the use of widely distributed trace tools such as TCPDUMP or IPTRACE. These trace tools are loaded on the network server and produce a display or hardcopy of the packets exchanged between the client and server. Another approach to debugging network problems involves adding specialized hardware known as a "sniffer" to the subnet of the client or server. Both of these conventional debugging methods, unfortunately, assume or require the presence of diagnostic personnel at the server site or the client site. Frequently, however, personnel capable of interpreting the information provided by conventional diagnostic techniques are in geographically distant locations from either the network client or server. A vendor of network hardware and software might be required to debug network communications problems for a large number of customers, none of whom would necessarily have the tools or personnel to perform the necessary debugging. Therefore, it would be highly desirable to implement a solution that enables diagnosis of network level communication problems at a location remote from either the network client or network server. The solution implemented should ideally have little if any impact on system performance, cost, and complexity, and should, to the extent possible leverage from existing diagnostic tools.

SUMMARY OF THE INVENTION

The problems identified above are addressed by a system and method according to the present invention for enabling remote diagnostics of client-server interactions. The invention contemplates enabling a diagnostic mode on the network client in which packets exchanged between the network client and network server are duplicated to a third party host. The invention permits remote diagnosis of client-server interactions and eliminates or greatly reduces the need for highly trained personnel and/or specialized hardware at the client site to correct problems.

Broadly speaking, the invention contemplates a computer network and network client where the network client includes a nonvolatile storage device for storing a packet replication indicator and a third party host identifier. The client further includes means for modifying the state of the packet replication indicator and the third party host identifier. The client has means for initiating a boot code sequence stored on a boot code storage device of the client. If the client detects a specified state of the packet replication indicator, the boot code sequence establishes a communication socket with a third party host identified by the third party host identifier and forwards copies or replicates of packets that are exchanged between the network client and a network server. In one embodiment the packets are replicated to the third party host until the boot sequence terminates. Packet replication may also be terminated, in the preferred embodiment, by an appropriate input sequence such as a keyboard entry at the third party host. The appropriate keyboard sequence prompts the third party host to terminate the dedicated socket. In addition, the third party host can send an ICMP message to the network client indicating that the socket has been terminated if the network client continues to send packets to the host. The ICMP message, in one embodiment, may alter the packet replication setting of the network client for the duration of the client's power tenure. The third party host identifier is preferably comprised of an IP address portion and a third party host port identifier portion. In one embodiment, the means for modifying the packet replication indicator is invoked through a user interface that is produced in response to a specified input sequence during execution of the boot sequence. The boot code sequence may be initiated through the use of a reset button on the client or through a network wakeup event initiated by the network server. Packets are preferably replicated at the data link layer to minimize the effect of various hardware and media specific network implementations. The network interface, for example, may reside within a token ring or Ethernet subnet.

The invention further contemplates a computer network diagnostic method in which a communication socket is established between a network client and a third party host. Network packets are then communicated between the network client and a network server. Replicates of the network packets on the network client are generated while the network client is executing a boot sequence and the replicates are forwarded to a third party host. In one embodiment, a packet replication indicator and a third party host identifier are specified on the network prior to establishing the communication socket. In this embodiment, the communication socket is established in response to detecting that the packet replication indicator is set. The setting of the third party host identifier includes setting a third party host IP address and a third party host port number. The third party host port number is a user defined port number in the preferred embodiment. In one embodiment, the diagnostic method of the invention further includes invoking means for viewing the replicated network packets, such as a trace tool, on the host machine.

BRIEF DESCRIPTION OF THE DRAWINGS

Other objects and advantages of the invention will become apparent upon reading the following detailed description and upon reference to the accompanying drawings in which.

Figure 1:
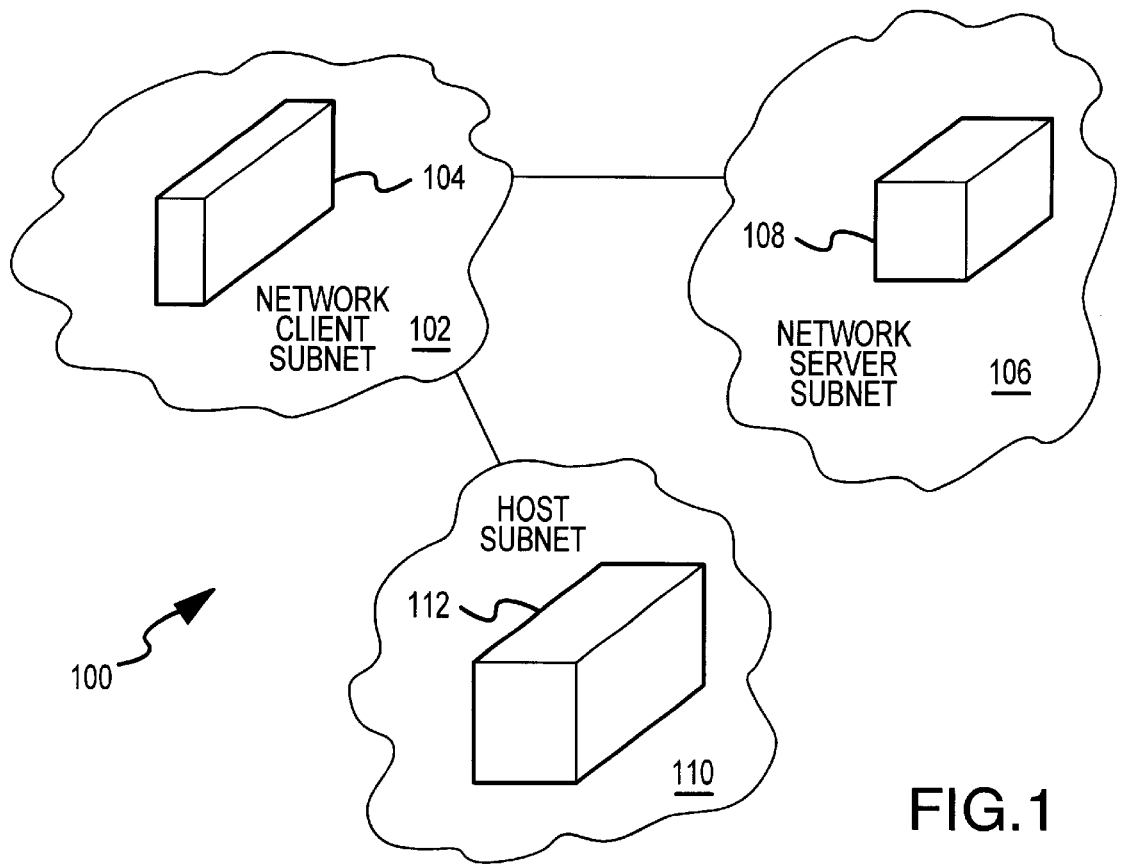
FIG. 1 is representation of a computer network according to the present invention.

While the invention is susceptible to various modifications and alternative forms, specific embodiments thereof are shown by way of example in the drawings and will herein be described in detail. It should be understood, however, that the drawings and detailed description presented herein are not intended to limit the invention to the particular embodiment disclosed, but on the contrary, the intention is to cover all modifications, equivalents, and alternatives falling within the spirit and scope of the present invention as defined by the appended claims.

DETAILED DESCRIPTION OF A PREFERRED EMBODIMENT OF THE PRESENT INVENTION

Turning now to the drawings, FIG. 1 is a conceptualized representation of a computer network 100 according to one embodiment of the present invention. The depicted embodiment of network 100 includes a network server 108, a network client 104, and a third party host 112. Server 108 resides in a network server subnet 106 while network client 104 and host 112 reside in subnets 102 and 110 respectively. The configuration or media of each subnet 102, 106, and 110 in network 100 is implementation specific and the present invention is not restricted to a particular implementation. Accordingly, computer network 100 may include one or more Ethernet subnets, one or more token ring subnets, or a combination thereof. In one embodiment of the invention, the network client 104 is designed essentially as a low cost tool for accessing data and applications that reside on the network server subnet 106. In such an embodiment, the network client 104 may lack a large scale permanent storage device such as a hard disk. The lack of permanent storage implies that network client 104 will be required to load its operating system from an external source such as network server 108.

Maximum network design flexibility is achieved by permitting the subnets 102, 106, and 110 to physically reside at any location. Accordingly, in one embodiment of the invention, the network server subnet 106, the network client subnet 102, and the host subnet 110 all reside in different physical locations. This embodiment is consistent with market realities in which network systems are required to communicate over wide geographic regions. Widely disbursed computer networks, while highly desirable from the customers perspective present unique problems when attempting to debug network computers. The wide variety of communications protocols in use and the intricacies of client-server interactions essentially guarantee some degree of network level debugging when a new network is created or when a new subnet, node, or client is added to an existing network. Debugging network level communication problems has typically been achieved through the use of tracer programs installed on the network server or through the use of external hardware or "sniffers." Both of these solutions require a physical presence at either the site of the network server or the site of the network client. The present invention contemplates the ability to debug network problems on physically distant network machines requiring extensive modification of the existing hardware.

Figure 2:
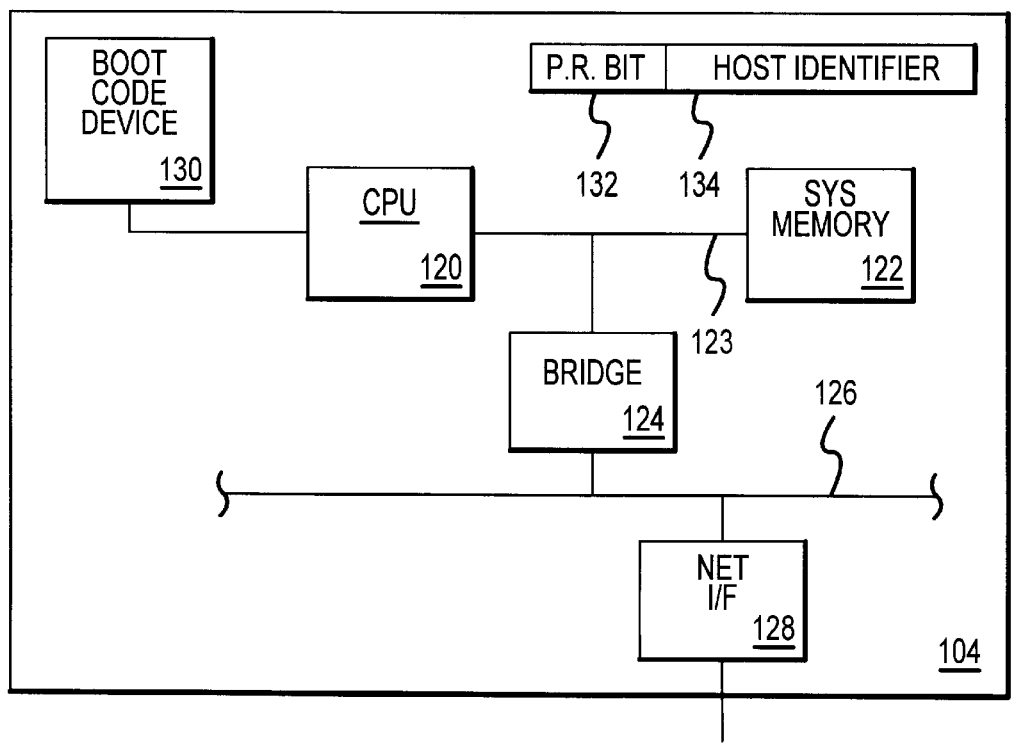
FIG. 2 is a simplified block diagram of a network client according to the present invention.

Turning to FIG. 2, a simplified block diagram depicting one embodiment of a network client 104 according to the present invention is presented. Network client 104 includes a processor 120 coupled to a system memory 122 via a system bus 123. Processor 120 may include one or more levels of cache memory not specifically indicated in the drawing. Also not shown for the sake of simplicity is a memory controller that provides an interface between system memory 122 and system bus 123. In the preferred embodiment, system memory 122 comprises an array of dynamic RAM storage elements as is well known in the field. An I/O bus bridge 124 couples the system bus 123 to an I/O bus 126. I/O bus 126 is suitably adapted for receiving a variety of peripheral devices such as network controllers, graphics adapters, etc. I/O bus 126 is preferably compliant with an industry standard bus architecture such as the PCI, ISA, EISA, or MCA bus architectures. In the depicted embodiment of network client 104, a network interface 128 provides a communication path between the network client and its subnet 102 according to the specific implementation of subnet 102 (i.e., Ethernet, token ring, etc.). Network client further includes a boot code storage device 130. As its name implies, boot code storage device 130 provides dedicated memory space for a software routine that boots network client 104. As used. in this disclosure, the term "boot" is used to refer to a process by which network client 104 is transitioned from a standby or essentially inoperable state to an operable state. In the embodiments of the present invention in which network client 104 lacks permanent random access storage, a primary function of the boot code is to download an operating system kernel from network client 108. Network client 104 is preferably configured to initiate the boot code sequence stored in boot code storage device 130 in response to a boot event. A boot event that initiates the boot sequence may include the pressing of a reset button on the cabinet of network client 104 or a network wakeup event via network interface 128 that is initiated by network server 108 or any other device on network 100.

According to the preferred embodiment of the present invention, the boot code sequence stored in boot code storage device is enabled to present the user with a replication configuration screen in response to detecting a specified input sequence during the execution of the boot code sequence. As an example, in one embodiment of the invention, a specified keyboard entry detected during the initial phase of the boot sequence, halts the execution of the boot sequence and presents the user with a replication configuration screen. The replication configuration screen provides a user friendly interface for modifying replication settings of network client 104. In the preferred embodiment, network client 104 includes a packet replication indicator 132 in the form of one or more bits of non-volatile storage. The replication configuration screen permits the user to modify the setting of packet replication indicator 132. In one embodiment, the packet replication configuration screen interface may present the user with the option of changing any of a variety of system parameters and settings not specifically associated with the packet replication features of the invention. In other words, the replication configuration screen may comprise a modified version of a "setup" menu that is familiar in the field. Setup parameters, including packet replication indicator 132, that may be altered through the use of the configuration menu are preferably stored in a non-volatile storage element such as a flash memory device, an EEPROM device, or a battery backed CMOS memory device.

In the preferred embodiment of the invention, network client 104 further includes a programmable third party host identifier 134 that is alterable via the replication configuration menu in the same manner as the packet replication indicator 132. The invention contemplates creating essentially duplicate copies of communication packets that are communicated between network client 104 and network server 108 and forwarding the duplicated or replicated packets to third party host 112. Flexibility is achieved by permitting network client 104 to identify the location of the third party host 112. In the preferred embodiment, a UDP/IP communication protocol is used to convey packets between the various subnets of computer network 100. In such an embodiment, the host identifier 134 preferably includes a UDP/IP compliant address including an IP address and a port number. When the user invokes the replication configuration screen during a boot sequence and sets the packet replication indicator 132 to enable packet replication, the user is prompted, in the preferred embodiment, to enter a validly formatted IP address and a port number. In a presently preferred embodiment, the port number is a user defined port. Thus, in the preferred embodiment, a user that wants to enable packet replication initiates a boot sequence of network client 104, such as by pressing the reset button on the system cabinet, and invokes the replication configuration screen by entering an appropriate keyboard sequence before the boot routine has had time to complete. The user is then presented with the replication configuration screen which includes the packet replication indicator 132 for enabling packet replication and the host identifier information 134. After setting the packet replication indicator 132 and entering the IP address and port for host machine 112 in host identifier field 134, the user exits the replication configuration menu and the boot code sequence is re-initiated. The boot code sequence checks the state of the packet replication indicator 132. Detecting that the packet replication indicator 132 is set, the boot code sequence initiates a routine to establish a dedicated communication link or socket with the third party host identified by host identifier 134. If the routine successfully establishes the dedicated socket, the boot code sequence continues in a manner substantially similar to the manner in which the boot code sequence would execute in the absence of packet replication indicator except that the packets exchanged between network client 104 and network server 108 during the execution of the boot code sequence are forwarded to the third party host.

Figure 3:
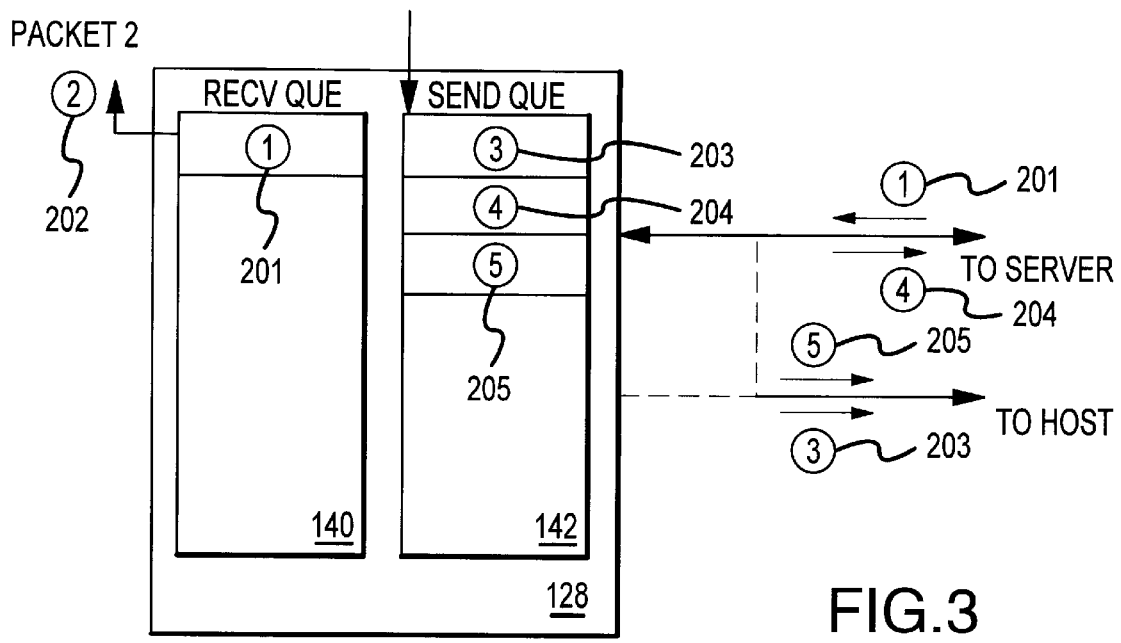
FIG. 3 is a conceptualized representation of packet replication according to the present invention.

Turning to FIG. 3, a conceptualized representation of the packet replication process is presented. The depiction is intended to indicate the process by which packets transmitted between network server 108 and network client 104 are copied to third party host 112. In FIG. 3, network interface 128 is shown as including a receive queue 140 and a send queue 142 for temporarily buffering incoming and outgoing network packets, which are represented in FIG. 3 by circled numerals. A first packet 201, represented by the circled numeral 1, exemplifies a packet inbound to client 104 from server 108. When first packet 201 arrives at network interface 128 of network client 104, it is stored in receive queue 140. If packet replication is enabled (through appropriate setting of packet replication indicator 132), first packet 201 percolates up through the protocol stack of the client-server link. The replication of packet 202 is achieved by encapsulating second packet 202 with header information and other protocol information appropriate to the communication protocol implemented on the client-host link and necessary to indicate the destination computer (i.e., third party host 112). The replicated packet is indicated in FIG. 3 as third packet 203. In this manner, the preferred embodiment of the invention contemplates replicating packets at the data link layer to achieve platform independence. Third packet 203 is then stored in the send queue 142 of network interface 128 where it awaits transmission to third party host 112. Fourth packet 204 represents a client generated packet destined for network server 108. This packet is generated and transmitted in a conventional manner and is essentially unaffected by the presence of the packet duplication scheme described herein. If replication is enabled, however, fourth packet 204 is replicated in a similar fashion to the replication process that occurs for second packet 202 to produce a fifth packet 205 that will be forwarded to third party host 112. To prevent an endless loop in which replicated packets are stored in send queue 142 and then re-replicated, all replicated packets stored in send queue 142 are tagged with an identifier that is detected by the replication driver that prevents the driver from essentially re-replicating packets in send queue 142.

The packet replication, once started, may be interrupted and terminated by a user located at the third party host 112 by an appropriate input sequence such as a keyboard command. In response to the terminate input sequence, the third party host will terminate the dedicated socket. If packets continue to arrive at third party host 112, the host can initiate and transmit an appropriate ICMP message to inform network client 104 that the dedicated communication socket is no longer accepting packets. The ICMP message, in one embodiment, may result in the alteration of the packet replication indicator 132 for the duration of the power tenure of client 104. In the preferred embodiment, the replication of packets is effectively terminated when the boot code sequence completes and control is relinquished to the operating system kernel that was loaded by the boot code sequence. The replicated packets produced and transmitted as described herein are received at a dedicated port of the host 112. The replicated packets may be viewed or otherwise analyzed by a user of third party host 112 using any of a variety of commercially distributed diagnostic tools such as packet tracing software. In this fashion, a diagnostic technician located at third party host 112 may perform a debugging procedure on a remote network-client link regardless of the diagnostic software tools available on the network or client and without having to utilize external sniffers.

Figure 4:
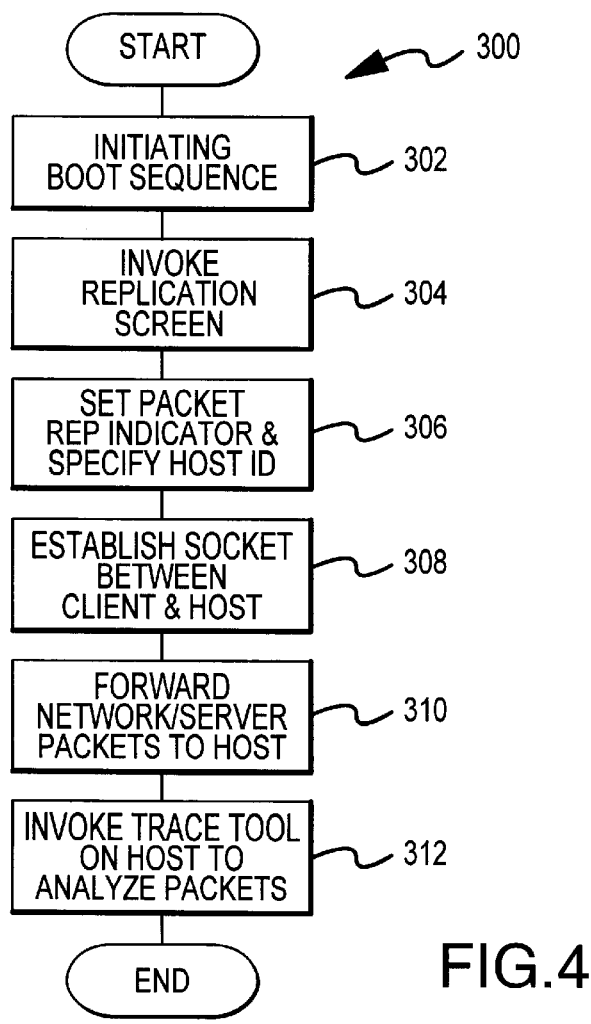
FIG. 4 is a flow diagram of a method of diagnosing network communication problems according to the present invention.

FIG. 4 is a flow diagram depicting an embodiment of a method 300 of remotely debugging a client-server connection through the packet duplication process. In step 302, a boot sequence is initiated on a network client. While the boot sequence is executing, a packet replication configuration screen is invoked in step 304 through an appropriate keyboard sequence. A packet replication indicator and third party host identifier are then entered via the configuration screen in step 306 and the boot sequence is re-initiated. In response to detecting the "set" state of the packet replication indicator, the network client establishes a dedicated communication socket with the third party host in step 308. After the socket is established, packets transmitted between the network client and the network server are replicated and forwarded to the third party host in step 310. In a presently preferred embodiment, a trace tool or other suitable diagnostic tool is invoked to view and analyze the replicated packets received from the network client. In one embodiment, the replication of packets is terminated with when the boot sequence completes and the operation system kernel assumes control.

It will be apparent to those skilled in the art having the benefit of this disclosure that the present invention contemplates a media independent mechanism and method for diagnosing network problems from a location remote to either the client or server. It is understood that the form of the invention shown and described in the detailed description and the drawings are to be taken merely as presently preferred examples. It is intended that the following claims be interpreted broadly to embrace all the variations of the preferred embodiments disclosed.

What is claimed is:

1. A network client, comprising:
   a boot code storage device including a boot code sequence, a packet replication indicator, and a third party host identifier;
   means for modifying the state of the packet replication indicator and the third party host identifier; and means for initiating the boot code sequence wherein, responsive to detecting a specified state of the packet replication indicator, the boot code sequence, in addition to retrieving at least a portion of its operating system kernel from a network server, establishes a communication socket with a third party host identified by the third party host identifier and thereafter forwards replicates of packets exchanged between the network client and the network server as part of the boot sequence.

2. The network client of claim 1, wherein the third party host identifier includes an IP address portion and a third party host port identifier portion.

3. The network client of claim 1, wherein the means for modifying the packet replication indicator is invoked through a user interface produced in response to a specified input sequence during execution of the boot sequence.

4. The network client of claim 1, wherein the means for initiating the boot code sequence comprises a reset button of the network client.

5. The network client of claim 1, wherein the means for initiating the boot code sequence comprises a network wake-up event from the network server.

6. The network client of claim 1, wherein the replication of packets occurs at the data link layer.

7. The network client of claim 1, wherein the network client resides on a token ring subnet.

8. The network client of claim 1, wherein the network client resides on an Ethernet subnet.

9. A computer network, comprising:
a network server residing on a server subnet;
a network client residing on a client subnet, the network client including;
a boot code storage device including a boot code sequence, a packet replication indicator, and a third party host identifier;
means for modifying the state of the packet replication indicator and the third party host identifier; and
means for initiating the boot code sequence wherein, dependent upon the state of the packet replication indicator, the boot code sequence, in addition to retrieving at least a portion of its operating system kernel from the network server, establishes a communication socket with a third party host identified by the third party host identifier and forwards replicates of packets exchanged between the network client and the network server as part of the boot sequence.

10. The computer network of claim 9, wherein the third party host identifier includes an IP address portion and a third party host port identifier portion.

11. The computer network of claim 9, wherein the means for modifying the packet replication indicator is invoked through a user interface produced in response to a specified input sequence during execution of the boot sequence.

12. The computer network of claim 9, wherein the means for initiating the boot code sequence comprises a reset button of the network client.

13. The computer network of claim 9, wherein the means for initiating the boot code sequence comprises a network wake-up event from the network server.

14. The computer network of claim 9, wherein the replication of packets occurs at the data link is layer.

15. The computer network of claim 9, wherein the third party host resides on a host subnet and the third party host, client subnet, and server subnet, are all in different geographic locations.

16. A computer network diagnostic method, comprising:
responsive to detecting a specified state of a packet replication indicator in a non-volatile storage device of a network client, establishing a communication socket between the network client and a third party host;
responsive to a boot event, communicating network packets between the network client and a network server as part of the boot sequence wherein the boot sequence includes retrieving at least a portion of an operating system kernel for the network client from the network server; and
generating replicates of packets exchanged between the network client and the network server as part of the boot sequence; and
forwarding the replicate packets to the third party host.

17. The method of claim 16, further comprising, prior to establishing the communication socket, setting the packet replication indicator and setting a third party host identifier on the network client.

18. The method of claim 17, wherein the setting of the third party host identifier includes setting a third party host IP address and a third party host port number, wherein the third party host port number is a user defined port number.

19. The method of claim 16, further comprising invoking means for viewing the replicated network packets on the host machine.

20. The method of claim 19, wherein the means for viewing comprises a trace tool on the third party host.

21. The method of claim 16, further comprising terminating the replication of packets responsive to an input sequence at the third party host by terminating a dedicated socket between the third party host and the network client.

22. The method of claim 21, further comprising sending an Internet Control Message Protocol (ICMP) message to the network client, responsive to receiving packets after the termination of the dedicated socket, wherein the ICMP message alters a packet replication setting on the network client.

* * * * *